US012739467B2

(12) United States Patent
Seed et al.

(10) Patent No.: US 12,739,467 B2
(45) Date of Patent: Sep. 15, 2026

(54) METHODS TO ENABLE USER-DEFINED CONTENT-AWARE OPERATIONS

(71) Applicant: INTERDIGITAL MADISON PATENT HOLDINGS, SAS, Paris (FR)

(72) Inventors: Dale Seed, Allentown, PA (US); Paul Dougherty, Springfield, PA (US); Sanghoon Kim, Chadds Ford, PA (US); Lu Liu, Conshohocken, PA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 47 days.

(21) Appl. No.: 18/280,658

(22) PCT Filed: Mar. 9, 2022

(86) PCT No.: PCT/US2022/019554

§ 371 (c)(1), (2) Date: Sep. 6, 2023

(87) PCT Pub. No.: WO2022/197508

PCT Pub. Date: Sep. 22, 2022

(65) Prior Publication Data

US 2024/0146999 A1 May 2, 2024

Related U.S. Application Data

(60) Provisional application No. 63/161,767, filed on Mar. 16, 2021.

(51) Int. Cl.

*H04N 21/44* (2011.01)
*H04N 21/422* (2011.01)
*H04N 21/472* (2011.01)

(52) U.S. Cl.

CPC . *H04N 21/44008* (2013.01); *H04N 21/42204* (2013.01); *H04N 21/47208* (2013.01)

(58) Field of Classification Search

None

See application file for complete search history.

(56) References Cited

U.S. PATENT DOCUMENTS 7,712,123 B2 5/2010 Miyaoku et al.
8,509,678 B2 8/2013 Baumgartner
(Continued)

FOREIGN PATENT DOCUMENTS

CN 103024556 A 4/2013
GB 2578234 A 4/2020

OTHER PUBLICATIONS

Hironaka et al., "Broadcast metadata providing system for hybrid cast," 2015 IEEE 5th International Conference on Consumer Electronics, pp. 328-329 (Sep. 6, 2015).

*Primary Examiner* — Cai Y Chen
(74) *Attorney, Agent, or Firm* — VOLPE KOENIG

(57) ABSTRACT

A method performed by a viewing device includes receiving a request for an operation to be performed by the viewing device. The request includes trigger criteria for performing the operation. The viewing device receives content from a content provider including content related metadata. A detection is made of a condition that the trigger criteria for the operation to be performed has been met. As a result, the viewing device performs the requested operation. The detection made be accomplished by the viewing device or by a service provider.

20 Claims, 10 Drawing Sheets

(56) References Cited

U.S. PATENT DOCUMENTS

| | | | | |
|---|---|---|---|---|
| 8,930,984 | B2 * | 1/2015 | Ehlers | H04N 21/23424 725/35 |
| 9,420,333 | B2 | 8/2016 | Martch et al. | |
| 9,516,378 | B1 * | 12/2016 | Chen | H04N 21/44008 |
| 10,425,669 | B2 | 9/2019 | Gupta et al. | |
| 2004/0205698 | A1 | 10/2004 | Schliesmann et al. | |
| 2010/0299707 | A1 | 11/2010 | Kim et al. | |
| 2013/0347029 | A1 | 12/2013 | Tang et al. | |

* cited by examiner

METHODS TO ENABLE USER-DEFINED CONTENT-AWARE OPERATIONS

CROSS REFERENCE TO RELATED APPLICATIONS

This application is a U.S. National Stage Application under 35 U.S.C. § 371 of International Patent Application No. PCT/US2022/019554, filed 9 Mar. 2022, which is incorporated herein by reference in its entirety and claims the benefit of U.S. Provisional Patent Application No. 63/161,767 filed 16 Mar. 2021 which is incorporated by reference herein in its entirety.

FIELD

The present principles relate to communications from digital television devices, specifically, they relate to a method to issue content-aware requests to the device such that the device performs content-aware operations on behalf of a user.

BACKGROUND

Devices capable of displaying broadcasted or streamed multimedia content currently lack the capability for users to issue on-the-fly content-aware requests to these devices such that the devices perform content-aware operations on behalf of the user. One example use case showing the need for content-aware requests is a husband and wife couple watching television (TV) together. The husband is an avid football fan while his wife is only a casual fan. The husband's favorite football team is currently playing, and the game is being televised live. The husband and wife watch the start of the game together, but the husband's team falls behind, so the wife begins to lose interest and asks if they could watch something else. The husband obliges but periodically switches back-and-forth between the game and the wife's program just to be sure that his team doesn't come from behind and the game becomes interesting again. The wife, however, eventually becomes annoyed at the switching back-and-forth and takes the remote from her husband so he can no longer check back on the game. The husband's team ends up coming from behind and winning the game, but unfortunately, the husband ends up missing the come-from-behind win.

The above example use case exhibits a need for content monitoring of one program while watching another without the use of a picture-in-picture or channel changing to actively examine the content to determine if the monored channel is preferable to watch.

SUMMARY

This summary is provided to introduce a selection of concepts in a simplified form as a prelude to the more detailed description that is presented later. The summary is not intended to identify key or essential features, nor is it intended to delineate the scope of the claimed subject matter.

In one embodiment, a method performed by a device includes receiving a request for an operation to be performed by the device. The request includes trigger criteria including a content-based event occurring within a content selection. The device sends the trigger criteria to a content provider. The device receives metadata related to the content-based event. A detection is made for the content-based event based on the received metadata. Once the trigger criteria is confirmed to be met, the device performs the requested operation.

Additional features and advantages will be made apparent from the following detailed description of illustrative embodiments which proceeds with reference to the accompanying figures. The drawings are for purposes of illustrating the concepts of the disclosure and is not necessarily the only possible configuration for illustrating the disclosure. Features of the various drawings may be combined unless otherwise stated.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the present principles. In the drawings, like numbers represent similar elements.

DETAILED DISCUSSION OF THE EMBODIMENTS

Figure 1:
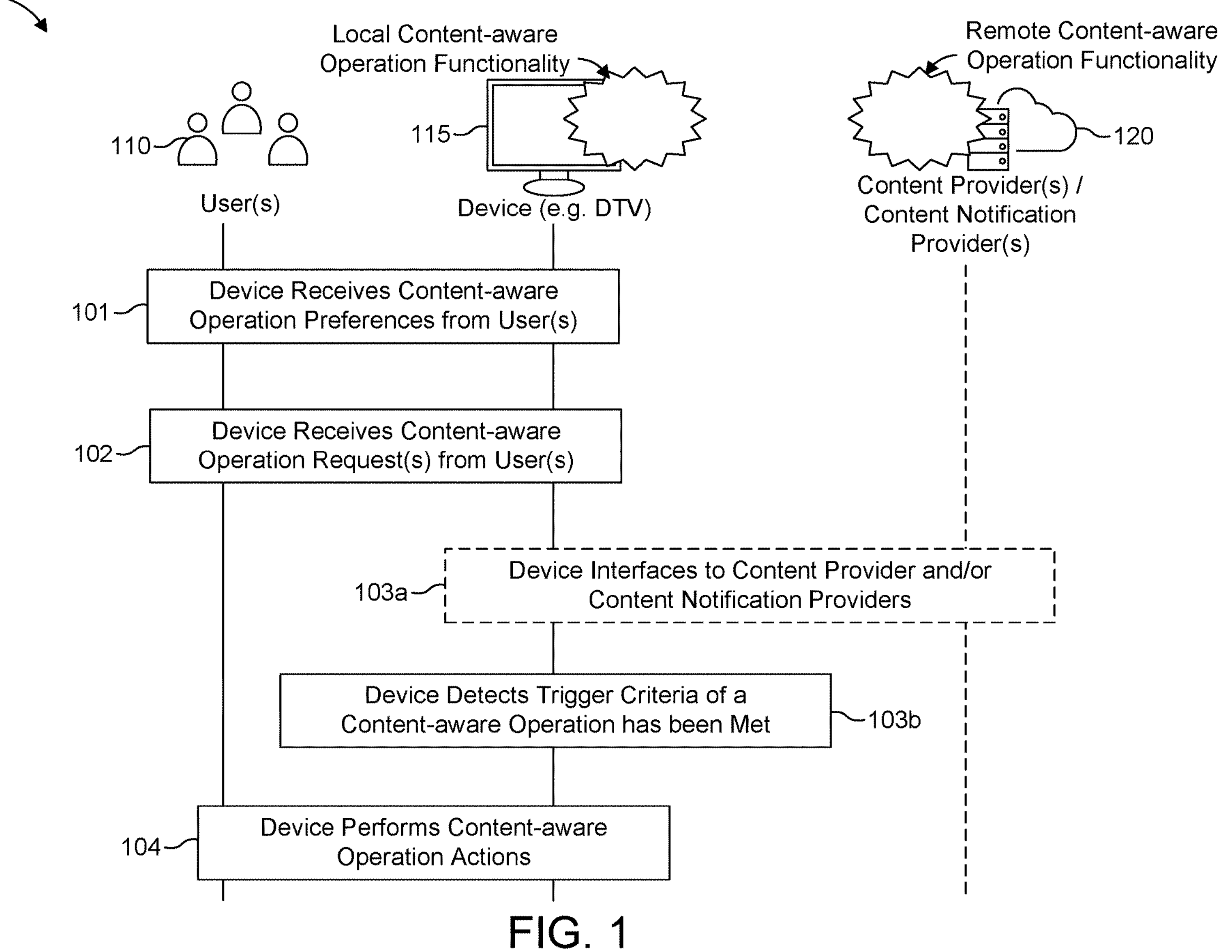
FIG. 1 depicts a diagram showing functional entities of the disclosure.

In the following description of various illustrative embodiments, reference is made to the accompanying drawings, which form a part thereof, and in which is shown, by way of illustration, how various embodiments may be practiced. It is to be understood that other embodiments may be utilized and structural and functional modification may be made without departing from the scope of the present principles.

The present disclosure defines methods, technology, and devices to address the need for content monitoring of one program while watching another as well as details for a device (e.g. digital television (DTV), phone, tablet, personal computer (PC), augmented reality head-mounted device (AR HMD), and the like) capable of playing broadcasted or streamed multimedia content (e.g. movies, shows, live sports, etc.) to support advanced user defined content-aware operations. This disclosure defines features that enable a device capable of playing broadcasted or streamed multimedia content (e.g. DTV, phone, tablet, PC, etc.) to support the capability for users to issue customized on-the-fly content-aware requests to the device such that the device performs content-aware operations on behalf of the user. For example, if a user is watching a televised game involving their favorite football team, and their team falls behind such that the user loses interest in the game, the user can switch to watching something else but also issue a request to the device to switch back to the game if their favorite team makes a comeback and is in contention to win the game. In doing so, the user doesn't need to manually switch back-and-forth to the game to determine if something interesting has happened.

Features of a multimedia device that supports content-aware functionality capable of content aware operations may include one or more of the following functions:

a. receive a request to configure a customized content-aware operation from a user.
b. process the request by parsing out the content-aware operation from the user.
d. determine whether the requested content-aware operation is supported by the device.
e. store the content-aware operation from the user.
f. return a response to the user indicating that the content-aware operation of the user has been accepted by the device.
g. monitor multimedia content and comparing the multimedia content against the requested content-aware operation of the user.
h. detect that content-aware trigger criteria defined within the content-aware operation have been met by the monitored multimedia content.
i. perform one or more content-aware actions defined within the content-aware operation (e.g. change over to the channel on which the multimedia content is being broadcasted).

The received content-aware operation request may be issued by a user to a device in one or more of the following manners:

a. a voice (or gesture) command issued from a user that comprises a customized content-aware operation, or
b. a request that is configured and issued to the device via an app on the user's smart device that comprises a customized content-aware operation, or
c. a series of one or more interactive device menu selections that are made by the user while interacting with the device (e.g. via a remote control) to configure the device with a customized content-aware operation, or
d. if bio-signal data is available for a user, the operations may be automatically created based on the user's measured response to the currently viewed content (e.g. "booing" when one team scores might result in creation of an operation to notify the user when the other team does something positive). This can be a "suggested" operation made available to the user that they could then confirm prior to being implemented by the system, or
e. if a user manually switches to a channel multiple times, the system may create an operation that notifies the user whenever anything of interest is happening on that channel. This can be a "suggested" operation made available to the user that they could then confirm prior to being implemented by the system.

A content-aware operation may include, but is not limited to, one or more of the following elements:

a. one or more multimedia content identifiers (e.g. a name, a channel, a scheduled timeslot, etc.) for specific content selections of interest (e.g. a specific movie, show, or sporting event, etc.).
b. one or more multimedia content selection filters that identify types of content that the user is interested in (e.g. favorite content genres, favorite sport teams, favorite actors, etc.).
c. content-aware trigger criteria such as but not limited to:
    i. A specified content-based event occurring within a multimedia content selection (e.g. the start/end of a timeout in a sporting event, the changing of the score in a sporting event, the performance by a particular singer in an awards show, a particular scene in a movie, the start of final jeopardy round, etc.).
    ii. The start/end of a commercial advertisement associated with a multimedia content selection.
d. A list of one or more content-aware actions that the device is to perform if/when the content-aware trigger criteria have been met:
e. content-aware operation preferences that apply to the user such as but not limited to:
    i. Default settings that apply to a user's content-aware operation requests such that the user does not need to specify these details in every request it issues to the device. For example, if/when the user does not specify the screen that it would like the device to display content on if/when a content-aware operation is performed by the device, then a default screen setting can be used for the user.
f. a schedule defining the times when the device is to perform content-aware operations.
g. a setting to enable and/or disable the device to perform content-aware operations.
h. an identifier of a user, an identifier of a user's device, and/or an identifier of an application hosted on a user's device where content and/or notifications are to be sent by the device.

The content-aware operations of a user may be stored in a location such as, but not limited to, the following:

a. local storage of the device (e.g. memory),
b. a peer device directly attached to the device (e.g. a set-top box (STB) communicatively coupled to a display device),
c. a service provided in the network and interconnected to the device (e.g. cloud server, gateway, etc.).

A response generated by the device in response to receiving a content-aware operation request, may be targeted towards one or more of the following:

a. A pop-up window displayed on the primary device screen.
b. A pop-up window displayed on the screen of a secondary device of a user.
c. A text message sent to a secondary device of a user.
d. A message sent to an application hosted on a secondary device of a user.
e. An audio alert that is played over the device sound system.

Monitoring of multimedia content to detect whether content-aware trigger criteria have been met, may include content-aware actions performed by the device such as but not limited to one or more of the following:

a. Inspecting received multimedia content using content monitoring inspection techniques such as:
    i. Processing of metadata piggybacked onto received multimedia content that includes additional information of relevance to the content and the content-aware trigger criteria and detecting if the criteria have been met, where the metadata may be generated by or associated with the multimedia content provider or provided by a third party service.

ii. Analyzing received multimedia content in real-time using deep multimedia content inspection algorithms to detect attributes of the multimedia content that match the content-aware trigger criteria specified by a user.

b. Sending to other entity(s) in the system (e.g. a Content Provider's Content Notification Provider) a user's content-aware trigger criteria such that the other entity can monitor and detect if/when the criteria have been met.

c. Subscribing to other entity(s) in the system (e.g. a Content Provider's Content Notification Provider) to be notified if a user's content-aware trigger criteria are met, Receiving from another entity in the system (e.g. a Content Provider's Content Notification Provider) notifications if/when a user's content-aware trigger criteria have been met.

Synchronizing a notification, received from another entity in the system, that trigger criteria for a content-aware operation have been met with the multimedia content that is received by the device.

The multimedia content-aware actions performed by the device in response to detecting that the multimedia content-aware trigger criteria have been met may include but are not limited to the following:

a. Send a message to a user notifying them that the criteria of interest have been met.

b. Ask the user whether they would like the device to transition over to playing the multimedia content applicable to the criteria.

c. Change the channel and play content on the device which meets the criteria.

d. Play/display onto a secondary device of the user, multimedia content which meets the criteria.

e. Record/buffer multimedia content clip(s) within a window of time before and/or after the point in time at which the content-aware trigger criteria have been met (e.g. a play in a game resulting in the score changing).

f. Generate/append multimedia content clip(s) onto an aggregated content collection (e.g. a user's personal content highlight reel).

g. Synchronize a content-aware operation generated by another entity in the system to the multimedia content that is received at the device, such that the actions performed by the device in response to the notification occur at the optimal time (e.g. the user does not miss the content that they are interested in seeing).

h. Resolving conflicts between multiple user-defined actions that may occur, by performing one or more of the following:

i. Prioritization of certain users and actions of certain users over others based on the user's profile (i.e. drop lower priority content-aware operations and actions).

ii. Recording/buffering of multimedia content, content-aware operations and actions such that they can be delayed and serialized after other multimedia content, content-aware operations and actions that are performed and not missed.

FIG. 1 depicts an functional diagram 100 depicting one or more entities to address the support device 115 (e.g. DTV, phone, tablet, PC, AR HMD) capable of playing broadcasted or streamed multimedia content (e.g. movies, shows, live sports, etc.) to support advanced user defined content-aware operations. The following is a summary of the proposed user-defined content-aware operation functionality:

In FIG. 1, the users 110 may utilize a remote device (not shown) to interact with a display device 115 or may interact directly with the display device 115. Content Providers 120 may act to interface with the display device 115. At 101, the interactive functionality (remote control or direct interaction) for enabling a user 110 to pre-configure a display device 115 with the user's default settings that the device then applies to any future content-aware operation requests that the user 110 may issue to the display device 115. This can simplify the interaction between the user and device by reducing the amount of information that the user needs to convey to the device within each individual content-aware operation request it issues to the device. For example, if a user would like the device, by default, to display the broadcasted or streamed multimedia content associated with a content-aware operation onto the device screen if/when the trigger criteria of the content-aware operation have been met, then the user can configure this as a content-aware operation default setting. In contrast, if a user would like the device, by default, to display the broadcasted or streamed multimedia content associated with a content-aware operation onto the screen of a secondary device (e.g. the user's smart phone), then the user can configure this as a content-aware operation default setting.

In FIG. 1 at 101, users 110 may issue requests to pre-configure a display device 115 (e.g. DTV) with their user-defined default settings applicable to subsequent content-aware operations that the user may issue to the device. The default settings are stored by the device 115 and applied to the subsequent content-aware operation requests it receives from the user 110. As a result, this content-aware operation default setting capability can reduce the amount of information that a user needs to include within any subsequent content-aware operation requests the user issues to the device. See hereinbelow for further details.

In FIG. 1 at 102, the interactive functionality for enabling a user to issue a request to a device may be present to have the display device 115 perform a customized content-aware operation on behalf of the user. The request may include user-defined trigger criteria and actions having relevance to broadcasted or streamed multimedia content that is of interest to the user. For example, issuing a request to a DTV to have it switch over to a political convention that is being televised when a user-specified person of interest begins their speech. In FIG. 1 at 102, users 110 issue individual requests to a device 115 (e.g. DTV) to have the device perform user-defined content-aware operations on their behalf.

In FIG. 1, at **103*b*, functionality may be present in the display device 115 for enabling the display device to detect if/when the trigger criteria defined by a user's content-aware operation have been met. Note, at 103*a*, this functionality may optionally involve the device interacting with another entity in the system (e.g. Content Provider's Notification Service 120**) to assist the device with the detection of this trigger criteria. For example, detecting when a user-specified person of interest begins their speech at a televised political convention that is broadcasted or streamed to the device.

In FIG. 1 at **103*a*, the device 115 may optionally interface to a Content Provider and/or a Content Notification Provider 120 for assistance with detecting if/when trigger criteria associated with a content-aware operation have been satisfied. See herein below for further details. At 103*b*, the device 115 detects that trigger criteria of a content-aware operation have been met. For example, the device may detect that the score of a game has changed, or a user-specified scene of interest in a movie has been reached. This step/function may be performed exclusively by the device 115 itself using content-aware operation functionality hosted locally by the device. Alternatively, the device may rely on information it receives from a Content Provider and/or Content Notification Provider 120 (i.e. Step 3***a*) to enable the device 115 to detect that content-aware trigger criteria specified by a user have been met.

In FIG. 1, at 104, the functionality for enabling the display device 115 to perform content-centric action(s) defined for the content-aware operation may be present if/when the corresponding trigger criteria of the content-aware operation have been met. For example, switching the channel over to the channel on which the political convention is being televised.

In FIG. 1 at 104, the device 115 performs one or more user-defined actions of the content-aware operation as a result of detecting that trigger criteria of the content-aware operation have been met. For example, the device may switch the display to show content of interest to the user, send a notification to a secondary device of the user (e.g. smart phone) regarding the content of interest, and/or record/buffer the content of interest for later viewing.

Note that although many of the embodiments described in this disclosure define content-aware operation functionality related to a display device such as a DTV, one skilled in the art will recognize that these proposed concepts may also be applicable to other types of consumer electronic devices such as but not limited to smart phones, tablets, PCs, etc.

Content-Aware Operation Default Settings

Figure 2:
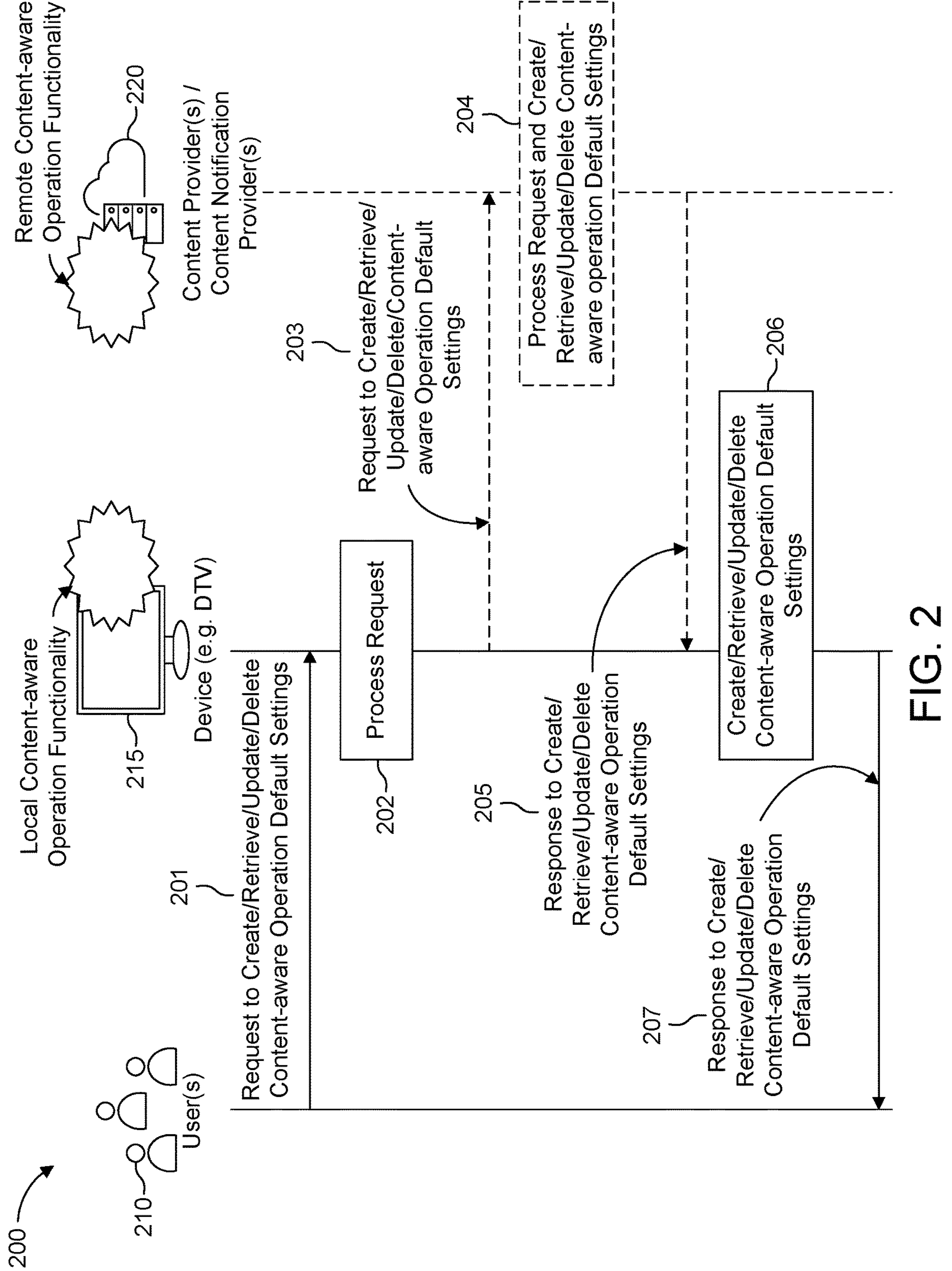
FIG. 2 depicts a message exchange and function diagram for establishing default settings.

FIG. 2 depicts a message exchange and function diagram useful for establishing default settings. As shown in FIG. 2, users 210 may configure a device 215 with default settings applicable to subsequent content-aware operation requests that they may issue to the device 215. These default settings comprise content-aware operation settings such as but not limited to those defined in Table 1. These default settings can be defined such that a user 210 does not need to specify the values of these elements within each individual content-aware operation that they issue to a device 215. Instead, defaults can be pre-configured by the user 210, stored by the device 215, and applied to each content-aware operation issued by the user 210. A user can choose to override a default setting of an element by explicitly including the element in an individual content-aware operation request that it issues to a device 215.

In FIG. 2 at 201, a user 210 issues a request to a device 215 to create, retrieve, update or delete user-defined content-aware operation default settings that may include the informational elements defined in Table 1. A user may issue this request to the device via different methods. For example, a voice command from a user that comprises content-aware operation default settings, a request that is configured and issued to the device via an app hosted on another device (e.g. on the user's smart phone) and that comprises content-aware operation default settings, or a series of one or more interactive menu selections that are made by the user while interacting with the device (e.g. via a TV remote control) to pre-configure the device with content-aware operation default settings.

In FIG. 2 at 202, the device 215 receives and processes the request by verifying whether the content-aware operation default settings are supported by the device's local content-aware operation services that it hosts. The device 215 may verify support by checking whether the specified settings are compatible with the device's supported content-aware operation service capabilities. For example, whether the device support actions such as issuing notifications to a user or recording a content segment of interest if/when the criteria of a content-aware notification have been met. If the requested operation cannot be supported locally, the device may forward the request to the Content/Notification Provider 220 to see if they can support the operation. In this instance, some operations will be done locally on device 215, and some operations may rely on the assistance of the remote entities, such as the content provider 220. The device 215 may maintain a record of which operation will be performed by which entity.

In FIG. 2 at 203, the device 215 may optionally send one or more requests to create, retrieve, update or delete content-aware operation default settings to Content Providers and/or Content Notification Providers 220 that support remote content-aware operation services. Within this request, the device 215 may include the informational elements defined in Table 1. For example, a device 215 may share a user's content-aware operation default settings with a Content Notification Provider 220 such that they can use these settings to customize the content-based notifications that are sent to the device 215. For example, a Content Notification Provider 220 may only send notifications that are applicable to the content of interest to the device's users and that contain information that is applicable to the user's defined content-based criteria.

In FIG. 2 at 204, The Content Providers and/or Content Notification Providers 220 receive and process the request(s) by checking whether the specified settings are compatible with their content-aware operation service capabilities. If so, the content-aware operation default settings are created, retrieved, updated or deleted.

In FIG. 2 at 205, the Content Providers and/or Content Notification Providers 220 return a response to the device 215 confirming whether the user's content-aware operation default settings were successfully created, retrieved, updated or deleted. Within this response, informational elements as defined in Table 1 may be included and possibly updated based on the capabilities of the Content Providers and/or Content Notification Providers 220.

In FIG. 2 at 206, if the device 215 determines that the user-defined content-aware operation default settings can be supported, the device creates, retrieves, updates or deletes the default settings for the user 210. Any default settings which are created or updated can later be accessed if/when the device 215 receives content-aware operation requests from the user 210. The device 215 may store content-aware operation default settings of a user in a location such as but not limited to local storage of the device 215 (e.g. memory), an attached peer device (e.g. a DTV, or set-top-box (STB) with a connected display not shown in FIG. 2), a service provided in the network and interconnected to the device (e.g. cloud server, gateway, etc. not shown in FIG. 2). The example device 215 shown in FIG. 2 is a DTV, may include but is not limited to a DTV, smart phone, tablet, laptop, smart watch, smart glasses, AR HMD, STB with connected display, etc.

In FIG. 2 at 207, the device 215 responds to the user 210 indicating whether the request to create, retrieve, update or delete the default settings for content-aware operations has been accepted or rejected by the device. Within this response, informational elements such as those defined in Table 1 may be included. The values of these elements may match those specified in the request or may be updated to account for changes that the device, Content Providers and/or Content Notification Providers 220 make to these elements (e.g. override values). Where the response may be targeted towards one or more of the following:

a. A pop-up window displayed on the device's screen.
b. An audio alert that is played over the device's sound system.
c. A pop-up window displayed on the screen of a secondary device of a user.
d. A text message sent to a secondary device of a user.
e. A message sent to an application hosted on a secondary device of a user.

Content-Aware Operation Requests

Figure 3:
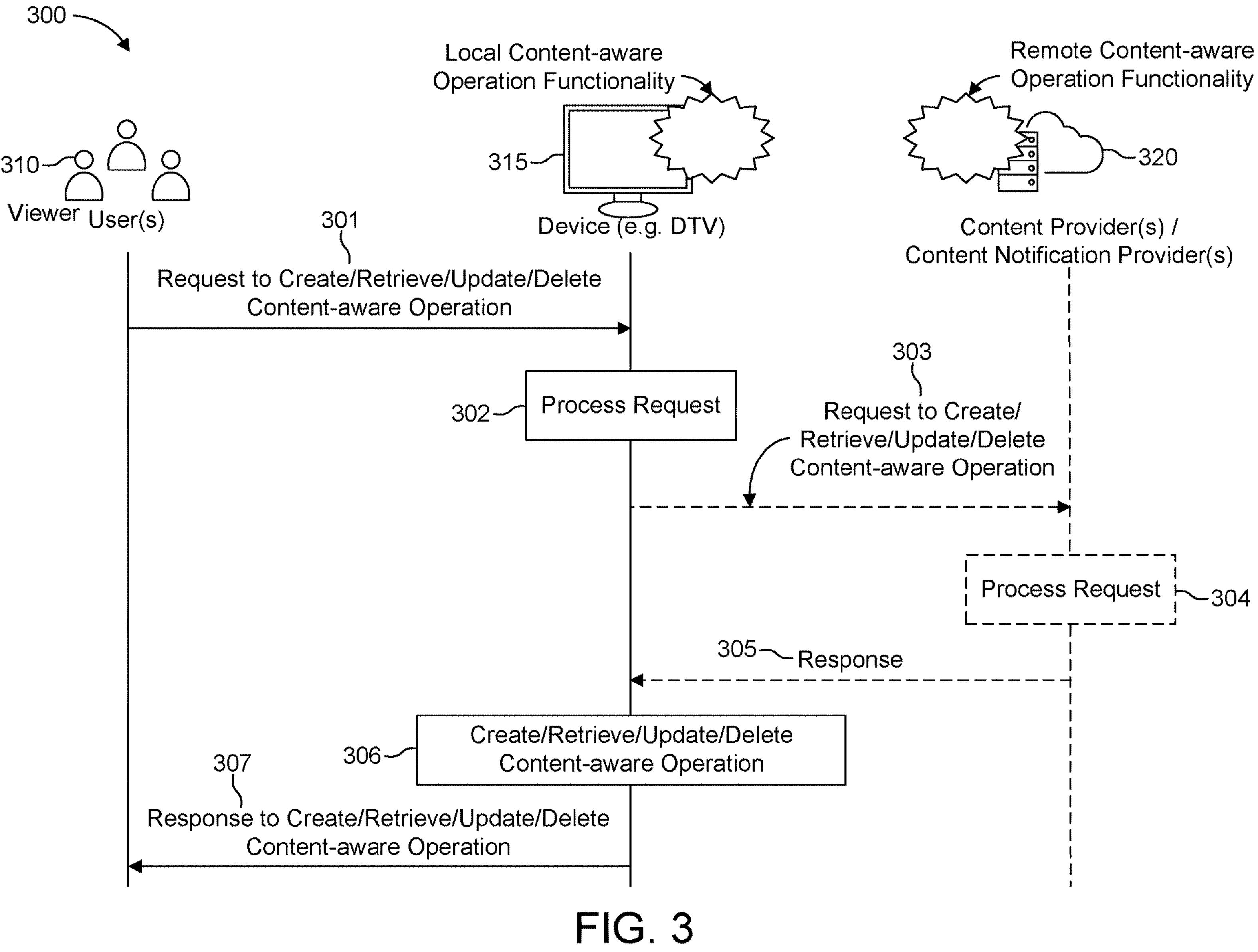
FIG. 3 depicts a message exchange and function diagram for configuring content-aware operations.

FIG. 3 depicts a message exchange and function diagram useful for configuring content-aware operations. As shown in FIG. 3, a user 310 may issue individual requests to a device 315 to have it perform user-defined content-aware operations on the user's behalf. These requests may take the form of a request that is issued by the user in an ad-hoc/on-the-fly manner (e.g. "Hey TV, show me when the Eagles are about to score today"). These operations may be short-lived and only applicable to a time duration defined by the content itself (e.g. the duration of a movie or show that is currently being broadcasted). Alternatively, a user 310 may configure the device 315 with more persistent or repeating content-aware operations which the device may store and use to perform re-occurring content-aware operations on behalf of the user if/when the trigger criteria of the operation have been met (e.g. "Hey TV, record each time the Eagles score"). In this case, the device may store a schedule of a repeating/re-occurring content-aware operation.

TABLE 1

Content-Aware Operation Default Setting Elements

| Information Element Name | Description |
|---|---|
| Content-Aware Operation Default Settings Request Identifier | A unique identifier that is included in a request to create, retrieve, update or delete content-aware operation default settings that are sent by a user to a device. This identifier is also included in the corresponding content-aware operation default settings response that is returned by a device to a user. This identifier is used to correlate a response with a request. |
| Content-Aware Operation Default Settings Identifier | A unique identifier (e.g. URI) of content-aware operation default settings of a user that are stored by the device. This identifier is generated by the device when the content-aware operation default setting is created and stored on the device. The identifier is returned to the user and used thereafter by the user to retrieve, update or delete the content-aware operation default settings stored on the device. |
| Default Content | Defines the default multimedia content broadcasted or streamed to the device that is applicable to a user's content-aware operations. This default is applicable if/when the user does not explicitly specify the applicable content in an individual content-aware operation. This may include information such as but not limited to the following:<br>Content identifiers (e.g. a name, a channel, a scheduled timeslot, etc.) of specific content selections of interest (e.g. a specific movie, show, or sporting event, etc.)<br>Content selection filters that identify types of content that the user is interested in (e.g. favorite content genres, favorite sport teams, favorite actors, etc.)<br>Channel/content that the user is currently watching. If the user is about to switch channels, he/she could leave a content-aware operation request that applies to the current channel and then switch channel. |
| Content Shortcuts | Defines aliases that can be associated with multimedia content selections and included in content-aware operations. An alias can serve as a shortcut (e.g. abbreviation) that can simplify content-aware operation requests issued by a user. A shortcut may include information such as but not limited to the following:<br>A tuple consisting of a shortcut/alias name (e.g. sixers, eagles, etc.) and a content identifier (e.g. Philadelphia 76ers, Philadelphia Eagles, etc.) |
| Default Content-aware trigger Criteria | Defines a default list of multimedia content centric user-defined criteria that when detected by the device, are used to trigger a user's content-aware operation. This default is applicable if/when the user does not explicitly specify trigger criteria within an individual content-aware operation. The list may include a user-defined content-based event occurring within a multimedia content selection such as but not limited to the following:<br>the start/end of a timeout or specified period in a sporting event,<br>the changing of the score in a sporting event,<br>the performance by a specified singer of interest in an awards show,<br>a scene of interest in a movie,<br>the start/end of a commercial advertisement<br>the start of the final round of play in game show such as Jeopardy,<br>a change in response to the content by other viewers of the content (e.g. increased excitement is detected in the reaction of other, potentially similar, viewers)<br>Video chapter for timestamp (Ex.) YouTube timestamp<br>etc. |

TABLE 1-continued

Content-Aware Operation Default Setting Elements

| Information Element Name | Description |
|---|---|
| Default Content-aware actions | A list of one or more default actions that the device is to perform if/when the trigger criteria of a content-aware operation have been met. This default is applicable if/when the user does not explicitly specify the actions in an individual content-aware operation. Actions may include but are not limited to one or more of the following: Send a message to a user notifying them that the content-aware trigger criteria have been met, Ask the user whether they would like the device to transition over to displaying the multimedia content applicable to the content-aware operation, Change displayed content on the device screen over to the multimedia content which meets the content-aware trigger criteria, Display onto a secondary screen of the user, multimedia content which meets the content-aware trigger criteria, Record/buffer multimedia content clip(s) that meet the criteria (e.g. a play in a game resulting in the score changing) for later and/or repeat viewing, Generate/append multimedia content clip(s) onto an aggregated content collection (e.g. a user's personal content highlight reel), |
| Default Content-Aware Notification Methods | Defines the default methods for the device to send content-aware notifications towards the user. The defaults are applicable if the user does not specify a method of notification in an individual content-aware operation. The methods may include but are not limited to the following: Send notification from the device to a user device (e.g. a device having a secondary display and/or audio capabilities) Send notification from the device to a holographic display in the vicinity of the user |
| Default Content-Aware Operation Schedule | A schedule defining the times when the device is to monitor and detect a content-aware operation trigger condition and/or perform the content-aware operation. The default schedule is applicable if the user does not specify a schedule in an individual content-aware operation. |
| Default Secondary Device IDs | List of default identifiers of secondary device(s) that the device sends notifications associated with content-aware operations towards. The default secondary devices are applicable if the user does not specify a secondary device in an individual content-aware operation. The user may include multiple devices in the list, and when a device is triggered to send content-aware operations, the user may select one of them or the device may select the most suitable device (e.g. based on device availability and device capabilities). |

In FIG. 3 at 301, a user 310 issues a request to a device 315 to create, retrieve, update or delete a user-defined content-aware operation that may include informational elements such as but not limited to those defined in Table 2. A user may issue this request to the device via different methods. For example, a voice command from a user that comprises a content-aware operation, a request that is configured and issued to the device via an app hosted on another device (e.g. on the user's smart phone) and that comprises a content-aware operation, or a series of one or more interactive menu selections that are made by the user while interacting with the device (e.g. via a TV remote control) to configure the device with a content-aware operation.

In FIG. 3 at 302, the device 315 receives and processes the request by verifying whether the type of content-aware operation that the user is requesting is supported by the device's local content-aware operation services that it hosts. The device 315 may verify support for the type of content-aware operation by checking whether the device has access to the specified content of interest and whether the specified trigger criteria and actions defined within the content-aware operation are supported by the device content-aware operation services. Before verifying support for the request, the device may first apply the user's default content-aware operation settings to the request which may add and/or update informational elements of the request.

In FIG. 3 at 303, the device 315 may optionally send one or more requests to Content Providers and/or Content Notification Providers 320 that support remote content-aware operation services to confirm whether they can support the user's requested type of content-aware operation. Within this request, the device may include the informational elements such as but not limited to those defined in Table 2. When sending these informational elements, it may not be necessary to send all the elements in the request to the Content Provider 320. For example, only applicable content and trigger criteria may be required.

In FIG. 3 at 304, the Content Providers and/or Content Notification Providers 320 receive and process the request(s) by verifying whether the type of content-aware operation that the user is requesting is supported. Before verifying support for the request, the Content Providers and/or Content Notification Providers may first apply the user's default content-aware operation settings to the request which may add missing elements not present in the request.

In FIG. 3 at 305: The Content Providers and/or Content Notification Providers 320 respond to the device 315 whether they can support the user's requested type of content-aware operation. Within this response, informational elements such as but not limited to those defined in Table 2 may be included.

In FIG. 3 at 306, if the device 315 determines that the requested type of content-aware operation is supported, the device creates, retrieves, updates or deletes information locally stored by the device regarding the content-aware operation of the user. Once created/updated, the stored information of a content-aware operation is accessed and used by the device to monitor for the detection of the user's content-aware trigger criteria and to determine what content-aware actions to perform if/when a content-aware operation is triggered. The device 315 may store content-aware operations of a user in a location such as but not limited to local storage of the device 315 (e.g. memory), an attached peer device (e.g. a DTV or display coupled to a set-top-box, not shown in FIG. 3), a service provided in the network and interconnected to the device (e.g. cloud server, gateway, etc. not shown in FIG. 3). The example device 315 shown in FIG. 3 is a DTV, may include but is not limited to a DTV, smart phone, tablet, laptop, smart watch, smart glasses, AR HMD, STB with connected display, etc.

In FIG. 3 at 307, the device 315 responds to the user 310 indicating whether the request to create, retrieve, update or delete the content-aware operation has been accepted or rejected by the device. Where the response may be targeted towards one or more of the following:

a. A pop-up window displayed on the device's screen.
b. An audio alert that is played over the device's sound system.
c. A pop-up window displayed on the screen of a secondary device of a user.
d. A text message sent to a secondary device of a user.
e. A message sent to an application hosted on a secondary device of a user.

TABLE 2

Content-Aware Operation Elements

| Information Element Name | Description |
|---|---|
| Content-Aware Operation Request Identifier | A unique identifier that is included in a request to create, retrieve, update or delete a content-aware operation that is sent by a user to a device and also included in the corresponding content-aware operation response that is returned by a device to a user. This identifier is used to correlate a response with a request. |
| Content-Aware Operation Preference Identifier | A unique identifier (e.g. URI) of a content-aware operation that is stored by the device. This identifier is generated by the device when the content-aware operation is created and stored on the device. The identifier is returned to the user and used thereafter by the user to retrieve, update or delete the content-aware operation from the device. |
| Applicable Content | Defines the content that is applicable to a user's content-aware operations. If this element is not included in the request and default content is configured (see Table 1), then a default is applied. This element may include information such as but not limited to the types of content centric information defined in Table 1 for "Default Content" or "Content Shortcuts". |
| Content-aware trigger Criteria | Defines a list of criteria that when detected by the device, are used to trigger a user's content-aware operation. If this element is not included in the request and default trigger criteria are configured (see Table 1), then a default is applied. The list may include but is not limited to the types of content-aware triggers defined in Table 1 for "Default Content-aware trigger Criteria". |
| Content-aware actions | A list of one or more actions that the device is to perform if/when the trigger criteria of a content-aware operation have been met. If this element is not included in the request and default content-aware actions are configured (see Table 1), then a default is applied. The list may include but is not limited to the types of content-aware actions defined in Table 1 for "Default Content-aware actions". |
| Content-Aware Notification Methods | Defines the methods for the device to send content-aware notifications towards the user. If this element is not included in the request and default content-aware notification methods are configured (see Table 1), then a default is applied. The list may include but is not limited to the types of notification methods defined in Table 1 for "Default Content-Aware Notification Methods". |
| Content-Aware Operation Schedule | A schedule defining the times when the device is to perform the content-aware operation. If this element is not included in the request and default content-aware schedule is configured (see Table 1), then a default is applied. |
| Content-Aware Operation Enable | A setting to enable/disable the device from performing the content-aware operation. If this element is not included in the request and default content-aware operation enable is configured (see Table 1), then a default is applied. |
| Secondary Device IDs | List of identifiers of secondary device(s) that the device sends notifications associated with content-aware operations towards. If this element is not included in the request and default secondary device IDs are configured (see Table 1), then a default is applied. |

Autonomous Processing of Content-Aware Operations by Devices

Figure 4:
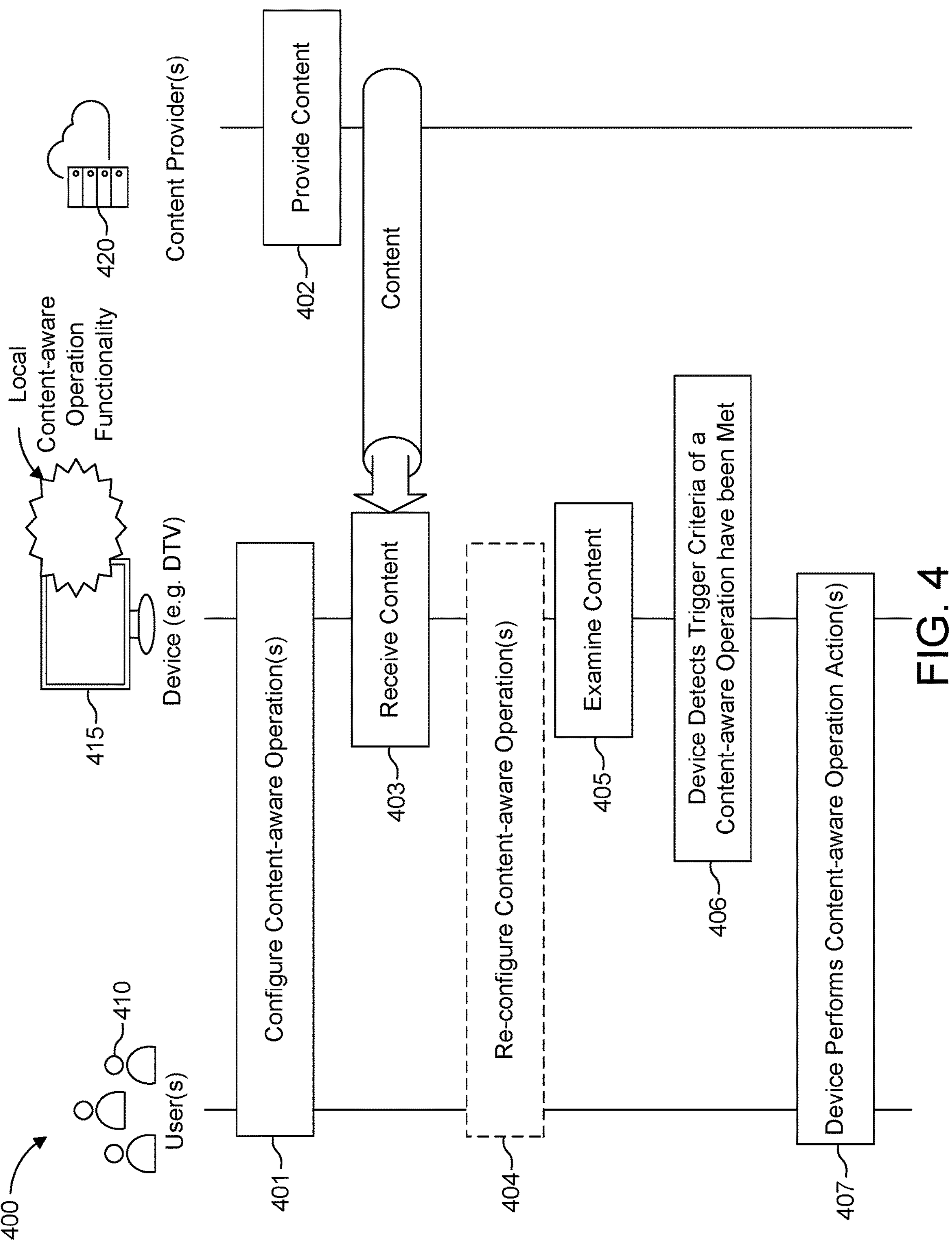
FIG. 4 depicts a function diagram showing local content examination and operation handling.

FIG. 4 depicts a function diagram of local content examination and local content-aware operation handling according to aspects of the disclosure. In FIG. 4, a device 415 may support local content-aware operation services that enable the device to autonomously process content-aware operations without needing assistance from other entities in the system. A device 415 with this capability may monitor and compare incoming content against trigger criteria defined within locally stored content-aware operations, detect if the trigger criteria have been satisfied and perform the actions defined by the locally stored content-aware operations.

In FIG. 4 at 401, processes such as those shown FIG. 2 and/or FIG. 3 to setup and configure content aware operations may be performed. At 402, Content Provider 420 may provide user selected multimedia content to the device 415 (e.g. move, TV show, live sporting event, etc.). At 403, the device 415 receives the multimedia content from the Content Provider 420. At 404, a user 410 may optionally configure new or re-configure existing content-aware operations as described in FIG. 2 or FIG. 3.

In FIG. 4 at 405, the device 415 locally examines the multimedia content to determine whether the user's content-aware trigger criteria have been met. To perform this local examination of the multimedia content, the device 415 may support deep multimedia content examination functionality. In one embodiment, this deep multimedia content examination functionality may be realized as a multimedia content examination engine that can support different multimedia content examination algorithms used to examine multimedia content of interest and detect whether specified criteria have been met by the multimedia content. The multimedia content examination engine may be policy-based such that it can be configured with inputs such as different types of multimedia content algorithms, multimedia content streams, multimedia content-aware trigger criteria. A device 415 may support the capability to configure this multimedia content examination engine with the information elements contained within the requests that the device receives from users 410 to configure the device 415 with content-aware operation default settings and/or one or more content-aware operations. The multimedia content examination engine can be used by the device to examine the multimedia content in real-time to detect the occurrence of specific content-based events that match those specified within the user's content-aware trigger criteria. The example device 415 shown in FIG. 4 is a DTV, may include but is not limited to a DTV, smart phone, tablet, laptop, smart watch, smart glasses, AR HMD, STB with connected display, etc.

In FIG. 4 at 406, the device 415 may detect that the user's content-aware trigger criteria have been met. In one embodiment, the device 415 may detect content-aware trigger criteria of the user via the multimedia content examination engine described at 405. For example, this detection may involve detecting content-aware trigger criteria related to content-based events such as but not limited to those defined in Table 1. For example, the start/end of a timeout or period in a broadcasted sporting event, the score changing in a broadcasted sporting event, the detection of a specific image or scene of interest in a show or movie, a particular show or movie is starting, a show or movie in which a favorite actor/actress stars in is starting and/or is reaching a certain point of interest.

In FIG. 4 at 407, upon detection that a user's content-aware trigger criteria have been met, the device 415 may perform one or more content-aware actions such as but not limited to one or more of the following:

a. Send a message to a user notifying them that the criteria of interest have been met.
b. Ask the user whether they would like the device to transition over to playing the multimedia content applicable to the criteria.
c. Switch over to playing/displaying multimedia content on the device, which meets the criteria.
d. Play/display onto a secondary device of the user, multimedia content which meets the criteria.
e. Record/buffer multimedia content clip(s) that meet the criteria (e.g. a play in a game resulting in the score changing) for later and/or repeat viewing.
f. Generate/append content clip(s) onto an aggregated content collection (e.g. a user's personal content highlight reel).

Content Provider Assisted Processing of Content-Aware Operations

Figure 5:
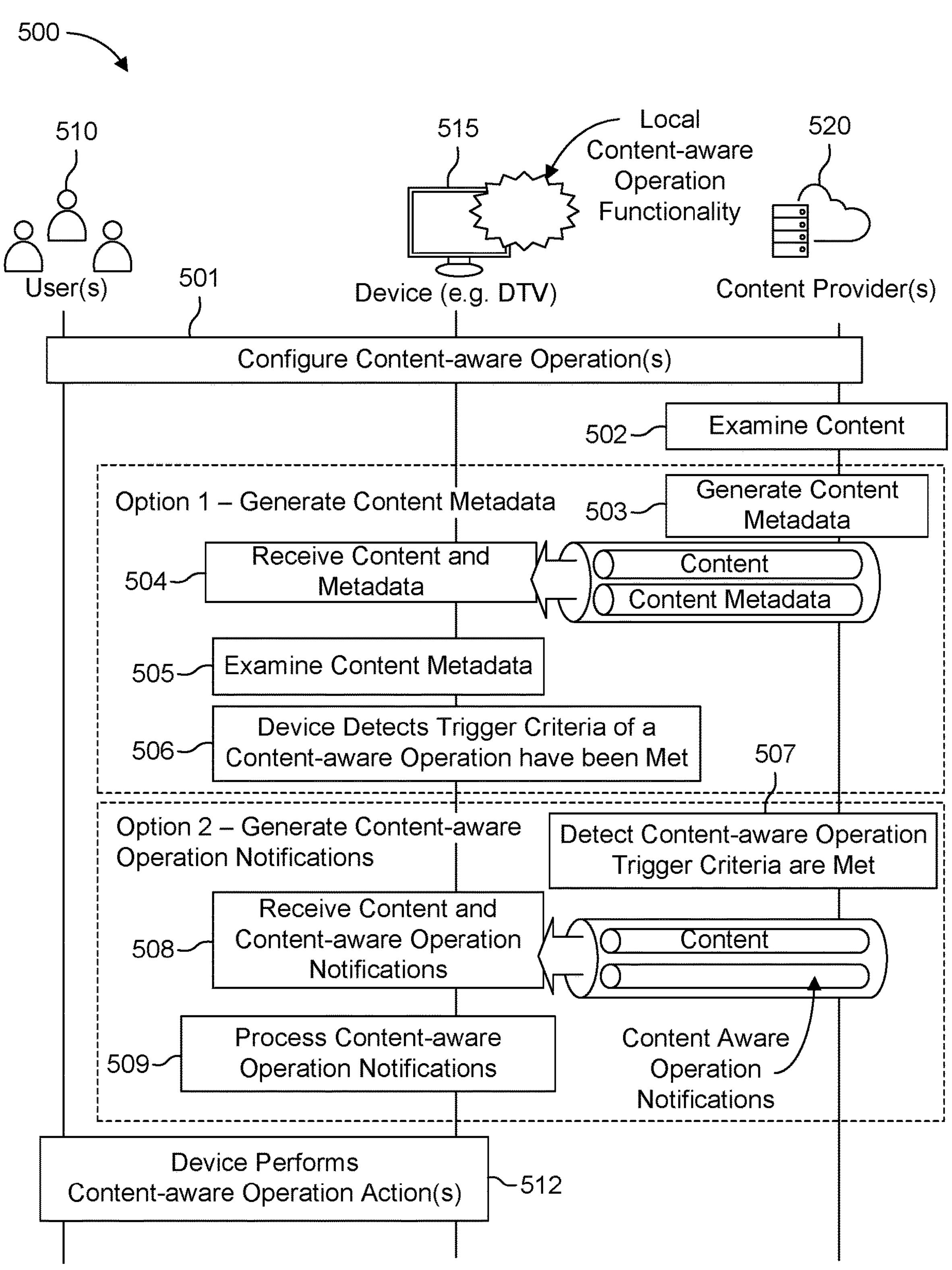
FIG. 5 depicts a functional diagram of content provider assisted processing.

FIG. 5 is an example depiction of a functional diagram for a content provider assisted processing of content-aware operations. In FIG. 5, a device 515 may rely on another entity (e.g. Content Provider 520) to provide it with content metadata in addition to raw content. Information contained within the content metadata may be used to enable the device to examine the content more easily and/or extensively to detect if/when user-defined content-aware trigger criteria have been met.

In FIG. 5 at 501, a content-aware operation is configured as in FIG. 2 or FIG. 3. In addition, the device 515 may share a user's 510 content-aware operation information with one or more Content Provider's 520. A device 515 can selectively share a user's content-aware operation information with only certain Content Providers. For example, only Content Providers which the device 515 determines to source multimedia content which is of interest to the user and meets the user's content-aware operation criteria (i.e. content-aware trigger criteria).

In FIG. 5 at 502, the content provider 520 examines the multimedia content to detect content-based events of interest. In one embodiment (in accordance with Option #1 shown in FIG. 5) a content provider 520 may identify prospective events that are likely to be interest to users. For example, a content provider may rely on past statistics of events that were of interest to users for similar types of multimedia content that is being currently consumed by users of a device. Based on this information and analytics, a content provider 520 may identify prospective content-based events that are likely to be of interest for the multimedia content that is being currently consumed by the users of a device.

In a related a second embodiment (in accordance with Option #2 shown in FIG. 5), the content-based events of interest may be defined by current users that have configured content-aware default settings and/or one or more content-aware operations on a device 515 that have been forwarded to the content provider 520. For example, content-aware trigger criteria containing content-based events of interest to users may be detected.

Option #1—Content Provider Generates Content-Aware Metadata

In FIG. 5 at 503, based on the results of examining the multimedia content to detect content-based events of interest at 502, the content provider 520 generates content metadata. This content metadata is then piggy-backed and sent along with the broadcasted or streamed multimedia content which the Content Provider distributes to devices, such as device 515. The generated content metadata may contain information about the content-based events that the content provider 520 detects. The content-based events within the content metadata may contain one or more elements defined in Table 3.

In FIG. 5 at 504, the device 515 receives the multimedia content and the content metadata from the Content Provider 520. At 505, the device 515 locally examines the content metadata to determine whether the user's content-aware trigger criteria have been met. To perform this local examination of the content metadata, the device 515 may support content metadata examination functionality that is used by the device to examine the content metadata in real-time to detect the occurrence of specific content-based events that match those specified within a user's content-aware trigger criteria. At 506, during or after the device 515 examining the content metadata, the device 515 detects that the user's content-aware trigger criteria have been met.

Option #2—Content Provider Generates Content-Aware Operation Notifications

In FIG. 5 at 507, based on the results of examining the content to detect content-based events of interest at 502, the content provider 520 performing option 2 may generate content-aware notifications. These content-aware notifications may be piggy-backed and sent along with the content which the content provider distributes. The generated content-aware notifications may contain one or more elements defined in Table 4.

In FIG. 5 at 508, the device 515 receives the multimedia content and the content-aware notifications from the content provider 520. In one implementation not specifically shown in FIG. 5 for option 2, a service provider, different from a content provider, may provide the metadata related to the content that provides a content-aware notification. Thus, the content provider and the service provider may be different entities at either the same or different network locations. At 509, the device 515 locally processes the content-aware notifications to determine if the device needs to perform any corresponding content-aware operations. This processing may involve the device comparing the content-aware operation identifiers present in the received content-aware notifications against the stored content-aware operation identifiers maintained on the device to find matches.

In viewing options 1 and 2 of FIG. 5, it is noticed that in both instances, at 504 and 508, the device 515 receives metadata that assists in detection of the presence of trigger criteria. Thus, in option 1, the device 515 receives metadata at 504 to assist in the determination if the trigger criteria are met in steps 505 and 506. In one instance, that metadata may be a notification that the trigger criteria are met. In a similar manner in option 2, the device 515 receives metadata, in the form of a notification from a service provider or the content provider, to assist in the subsequent processing at step 509. Thus, the reception of metadata at steps 504 and 508 is common in both option 1 and option 2 of FIG. 5. Common to both option 1 and option 2, the example device 515 shown in FIG. 5 is a DTV and may include but is not limited to a DTV, smart phone, tablet, laptop, smart watch, smart glasses, AR HMD, STB with connected display, etc.

In FIG. 5 at 512, upon detection that a user's content-aware trigger criteria have been met, the device 515 may perform one or more content-aware actions such as but not limited to those defined in Table 1. Note that the action at 512 may be performed as a result of exercising either option 1 or option 2 of FIG. 5.

TABLE 3

| Content-based Event Information | |
|---|---|
| Information Element Name | Description |
| Content Synchronization Marker | Information that enables the receiver to synchronize the content-based event to the content and may include but is not limited to the following:<br>An absolute timestamp<br>A relative timestamp (e.g. relative to the start time of the applicable content, relative to another event time, etc.)<br>Frame or slot numbers used in the transmission of the content and/or content metadata. |
| Applicable Content | Defines the multimedia content that this event is applicable to. This information element may include but is not limited to the following:<br>Content identifiers (e.g. a name, a channel, a scheduled timeslot, etc.) of specific content selection (e.g. a specific movie, show, or sporting event, etc.)<br>Content selection filters that identify types of content that this even is applicable to (e.g. favorite content genres, favorite sport teams, favorite actors, etc.) |
| Content-Based Notification Event | Defines the detected event. May include but is not limited to the following:<br>A specified content-based event occurring within a multimedia content selection (e.g. the start/end of a timeout or period in a sporting event, the changing of the score in a sporting event, the performance by a particular singer in an awards show, a particular scene in a movie, the start of final jeopardy round, etc.)<br>The start/end of a commercial advertisement associated with a multimedia content selection |

TABLE 4

| Content-aware Notification Information Elements | |
|---|---|
| Information Element Name | Description |
| Content-Aware Operation Identifiers | A list of unique identifiers of content-aware operations that apply to this content-aware notification. |
| Content Synchronization Marker | Includes information that enables the receiver to synchronize the content-aware notification to the multimedia content and may include but is not limited to the following:<br>An absolute timestamp<br>A relative timestamp (e.g. relative to the start time of the applicable content, relative to another event time, etc.)<br>Frame or slot numbers used in the transmission of the content and/or content metadata. |
| Applicable Content | Defines the multimedia content that this notification is applicable to. This information element may include but is not limited to the following:<br>Content identifiers (e.g. a name, a channel, a scheduled timeslot, etc.) of specific multimedia content selection (e.g. a specific movie, show, or sporting event, etc.)<br>Content selection filters that identify types of multimedia content that this even is applicable to (e.g. favorite content genres, favorite sport teams, favorite actors, etc.) |
| Content-Aware Notification Trigger Criteria | Defines the content-aware trigger criteria that this content-aware notification is applicable to and may include but is not limited to the following:<br>A specified content-based event occurring within a content selection (e.g. the start/end of a timeout or period in a sporting event, the changing of the score in a sporting event, the performance by a particular singer in an awards show, a particular scene in a movie, the start of final jeopardy round, etc.)<br>The start/end of a commercial advertisement associated with a multimedia content selection |

Content Notification Provider Assisted Processing of Content-Aware Operations

Figure 6:
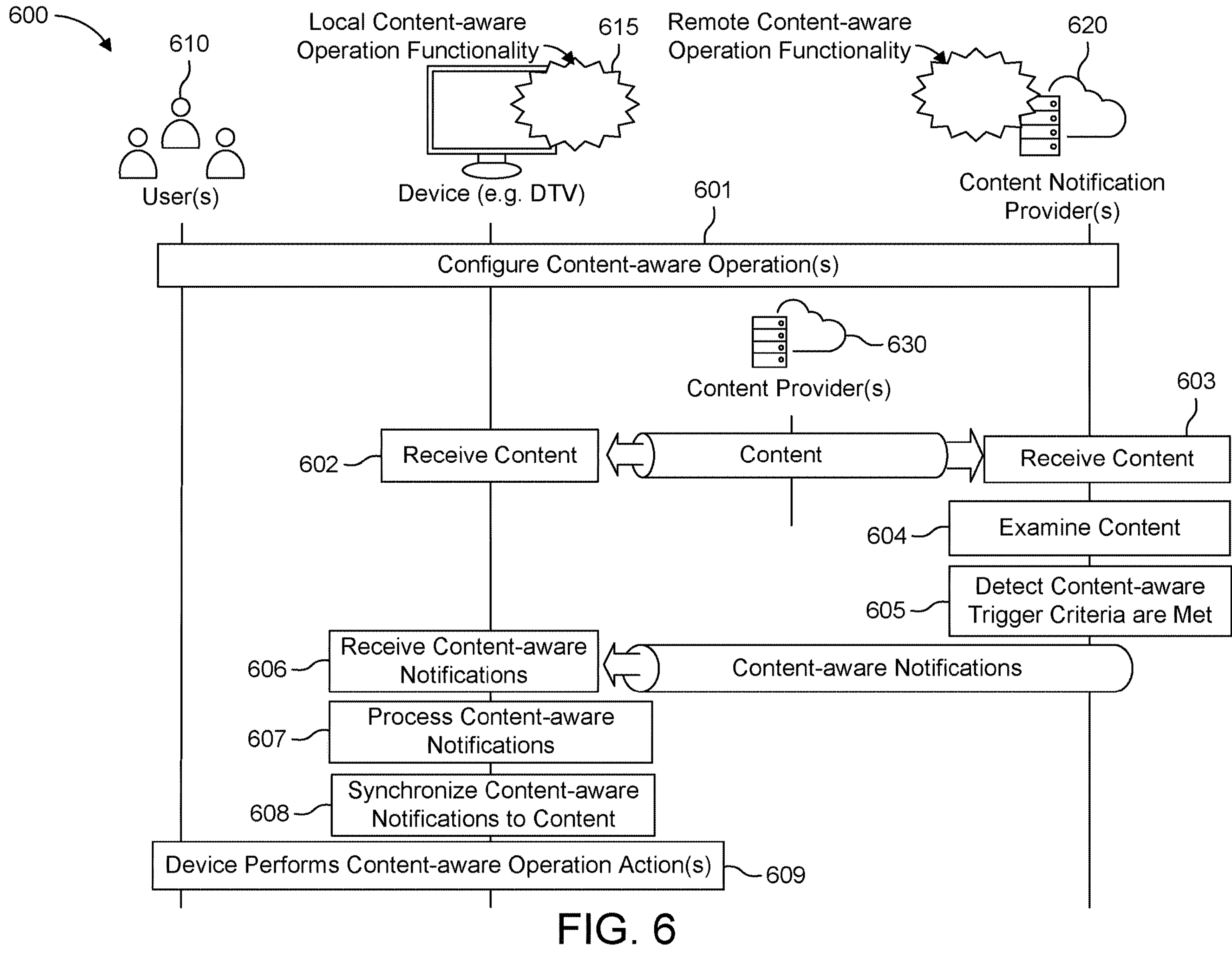
FIG. 6 depicts separate content notification provider functionality.

As shown in the procedure defined in FIG. 6, a device may rely on one or more Content Notification Providers that are separate and distinct entities from a Content Provider to provide it with content-aware notifications. A device may selectively subscribe to one or more Content Notification Providers that provide notifications having relevance to the multimedia content that the device's users are interested in. These content-aware notifications may be sent separately to the device rather than being piggy-backed along with the raw content that is sent from the Content Provider (i.e. the device receives the content and content-aware notifications separate and independent from one another). Although information contained within the content-aware notifications may be used to enable the device to determine if/when to perform content-aware operation, the content-aware notifications may not be synchronized to the content since they originate from a separate entity than the Content Provider. Hence the device may need to synchronize the content-aware notifications to the content.

FIG. 6 shows a separate content notification provider and content provider configuration. In FIG. 6 at 601, as described above with respect to FIGS. 2-3, setup and configuration for content aware operations is accomplished. In addition, the device 615 may share a user's 610 content-aware operation information with one or more Content Notification Provider's 620. A device 615 can selectively share a user's content-aware operation information with only certain Content Notification Providers 620. For example, only Content Notification Providers which the device determines to source multimedia content which is of interest to the user and meets the user's content-aware operation criteria (i.e. content-aware trigger criteria). In one embodiment, a device 615 may share a user's content-aware operation information via a subscription request that the device sends to the Content Notification Provider 620. In addition to a user's content-aware operation information, this subscription request may also include device callback information (e.g. an address such as a URI which the device 615 is able to receive notifications from the Content Notification Provider 620).

In FIG. 6 at 602 and 603, the Content Provider 630 provides multimedia content to both the device 615 and the Content Notification Provider 620. Alternatively, the Notification Provider 620 may selectively receive only the applicable content based on the user's default setting and request, or the device may inform the Notification Provider 620 to start receiving content only when the applicable content is detected.

In FIG. 6 at 604, the Content Notification Provider 620 examines the multimedia content to detect content-based events of interest. These content-based events of interest may be defined by current users that have configured content-aware operations that have been forwarded to the Content Notification Provider at 601. Alternatively, the content-based events of interest may be events that the Content Notification Provider 620 feels may be of interest to prospective users.

In FIG. 6 at 605, based on the results of examining the multimedia content to detect content-based events of interest of 604, the Content Notification Provider 620 generates content-aware notifications. These generated content-aware notifications may contain one or more elements defined in Table 4. The content-aware notifications are sent to the device 615.

In FIG. 6 at 606, the device 615 receives the content-aware notifications from the Content Notification Provider 620. At 607, the device 615 locally processes the content-aware notifications to determine if the device 615 needs to perform any corresponding content-aware actions. This processing may involve the device 615 comparing the content-aware operation identifiers present in the received content-aware notifications against the stored content-aware operations maintained on the device to find matches.

In FIG. 6 at 608, for any content-aware notifications which the device 615 needs to perform content-aware actions, the device 615 may need to locally synchronize the received content-aware notifications to the received multimedia content since they may have originated from two independent and non-synchronized sources (i.e. Content Provider 630 and Content Notification Provider 620). To perform this synchronization, the device 615 may use the content synchronization marker information element contained within each content-aware notification it receives. Using the content synchronization marker information element, the device can synchronize the notification to the multimedia content which may involve the device 615 synchronizing the notification and content based on absolute or relative timestamp information, transmission frame or slot number information.

In FIG. 6 at 609, if a match to a content-aware operation is found and once synchronization is performed, then the device 615 can extract the content-aware actions that it needs to perform from each matching content-aware operation set. The device 615 can then perform the one or more content-aware actions such as but not limited to those described Table 1.

System Level Embodiments

Figure 7:
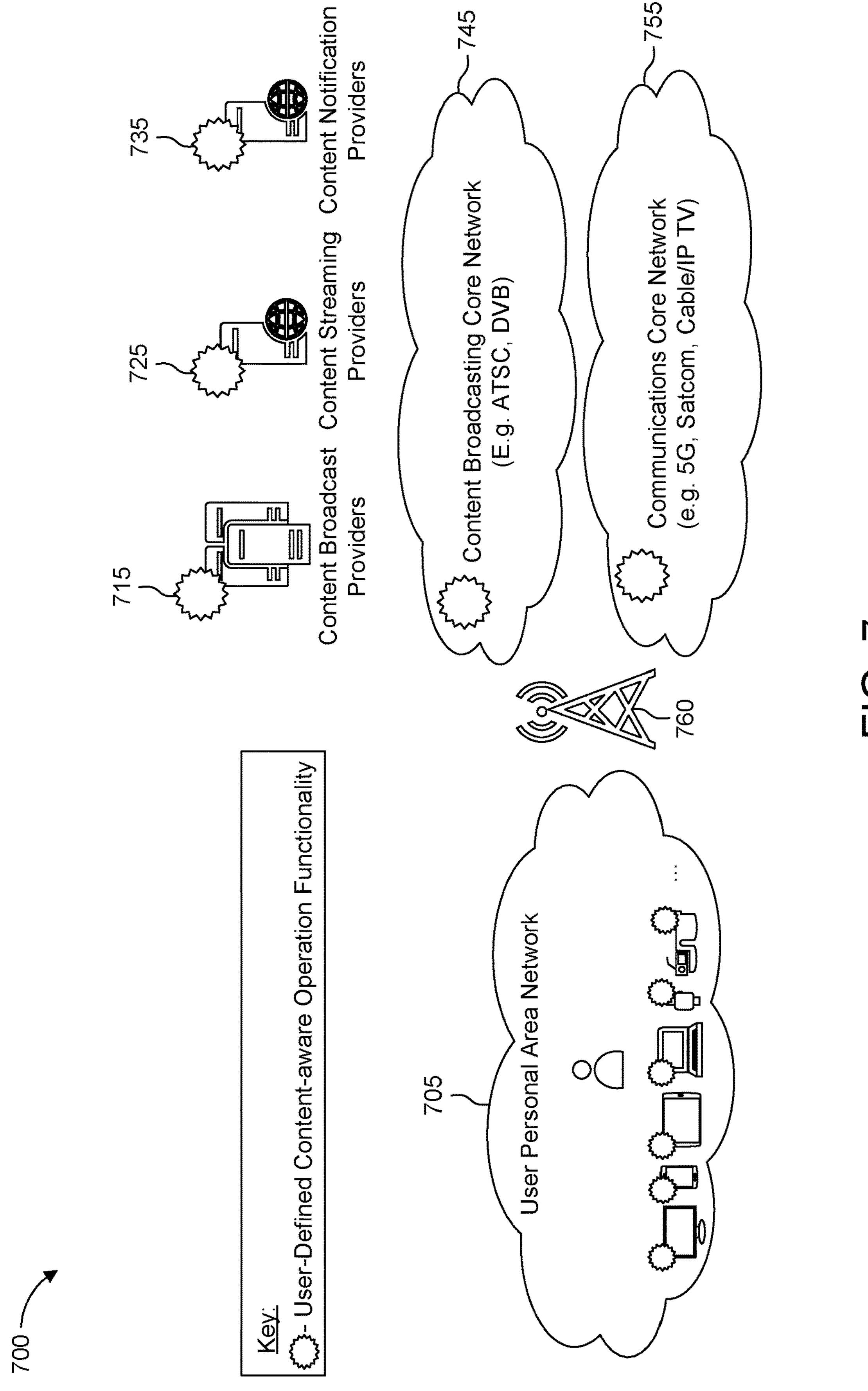
FIG. 7 depicts a system level embodiment of user-defined content-aware operation functionality.

FIG. 7 depicts representations 700 of several different types of entities in an end-to-end multimedia content distribution and consumption system in which the user-defined content-aware operation functionality proposed herein may be realized. As such, FIG. 7 depicts a system level embodiment of user-defined content-aware operation functionality.

Within a user's personal area network 705, various types of multimedia centric devices may support the proposed device-centric user-defined content-aware operation functionality proposed herein. Such devices may include but are not limited to a DTV, smart phone, tablet, laptop, smart watch, smart glasses, AR HMD, etc., not shown in FIG. 7. For example, the devices may support the capability to monitor multimedia content, detect user-defined content-aware event criteria, generate content-aware notifications, send content-aware notifications to users, and perform content-aware actions as described with respect to FIGS. 2-6. These devices may also interact via a network connection 760 with other entities in the system (e.g. various Content Providers, various core network nodes) to support these capabilities.

Various types of communications core networks 760 may support user-defined content-aware operation functionality proposed in this invention. Such communications core networks may include but are not limited to 5G, 4G, Satellite, IP, Cable TV networks. Within these network different types of network nodes/functions may support user-defined content-aware operation functionality. For example, the capability to assist devices with monitoring multimedia content, detecting user-defined content-aware event criteria, generating content-aware notifications, sending content-aware notifications to devices, and performing content-aware actions.

Various types of content broadcasting core networks may support user-defined content-aware operation functionality proposed herein. Such broadcasting core networks 745 may include but are not limited to networks based on the ATSC or DVB standards. Within these networks different types of network nodes/functions may support user-defined content-aware operation functionality. For example, the capability to assist devices with monitoring multimedia content, detecting user-defined content-aware event criteria, generating content-aware notifications, sending content-aware notifications to devices, and performing content-aware actions.

Various types of Content Providers may support user-defined content-aware operation functionality proposed herein. Such Content Providers may include but are not limited to those that broadcast content to devices 715, stream content to devices 725 and/or generate and send content-based notifications 735 to devices. These Content Providers may support user-defined content-aware operation functionality. For example, the capability to assist devices with monitoring multimedia content, detecting user-defined content-aware event criteria, generating content-aware notifications, sending content-aware notifications to devices, and performing content-aware actions.

Protocol Embodiments

Figure 8:
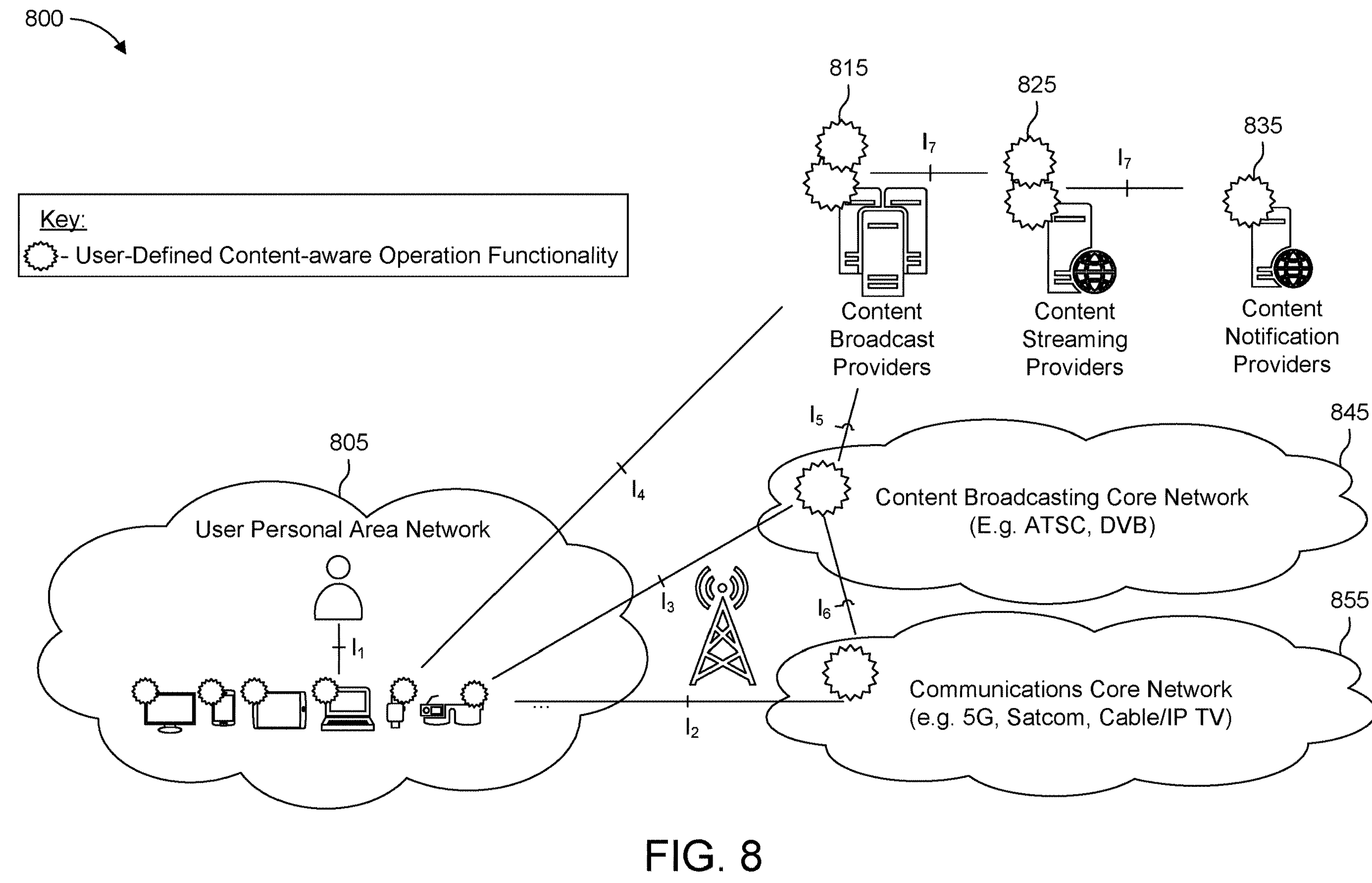
FIG. 8 depicts interfaces for a system level embodiment of user-defined content-aware operations.

FIG. 8 depicts a system level embodiment of user-defined content-aware operation showing various example interfaces. In FIG. 8, several potential interfaces within an end-to-end multimedia content distribution and consumption system over which user-defined content-aware operation functionality may be supported. A user personal area network 805 may interface with a content broadcast provider 815, a content streaming provider 825, a content notification provider 835. Also shown are an interface between the user personal area network 805 and a content broadcasting network 845 and a communication core network 855. Interfaces between the content broadcast providers 815, and the content broadcasting core network 45 is depicted as is an interface between the content broadcasting core network 845 and the communications core network 855.

Table 5 defines each of the proposed interfaces captured in FIG. 8. Each of these interfaces may support the exchange of user-defined content-aware operation messages between each of the applicable entities in the system. The collection of these messages may form a protocol that is used to enable the exchange and performing of user-defined content-aware operations in an end-to-end fashion throughout the system.

TABLE 5

User-Defined Content-Aware Operation Interfaces

| Interface | Description |
|---|---|
| $I_1$ | Interface between user and a device capable of playing broadcasted or streamed multimedia content (e.g. DTV, phone, tablet, PC, etc.) |
| $I_2$ | Interface between a device capable of playing broadcasted or streamed multimedia content (e.g. DTV, phone, tablet, PC, etc.) and communication core network entities |
| $I_3$ | Interface between a device capable of playing broadcasted or streamed multimedia content (e.g. DTV, phone, tablet, PC, etc.) and content broadcasting core network entities |

TABLE 5-continued

User-Defined Content-Aware Operation Interfaces

| Interface | Description |
|---|---|
| $I_4$ | Interface between a device capable of playing broadcasted or streamed multimedia content (e.g. DTV, phone, tablet, PC, etc.) and multimedia content providers (e.g. content broadcast providers, content streaming providers and content notification providers). |
| $I_5$ | Interface between content providers and content broadcasting core network entities |
| $I_6$ | Interface between content broadcasting core network entities and communication core network entities |
| $I_7$ | Interface between different content providers (e.g. content broadcast providers, content streaming providers and content notification providers). |

In one embodiment, a user-defined content-aware operation message protocol can be realized as a client/server messaging protocol where users and/or their personal devices can function in the role of a client and/or a server to exchange user-defined content-aware operation request and response messages with other entities in the system (e.g. Content Providers). For example, the information elements of the user-defined content-aware operation request and response protocol messages can be encapsulated and carried within the payloads of existing client/server protocols such HTTP, COAP or Web Sockets.

In another embodiment, these information elements can be encapsulated and carried within lower level protocols such as TCP or UDP without the use of higher layer protocols such as HTTP, COAP or Web Sockets.

In yet another embodiment, the user-defined content-aware operation messages can be encapsulated and carried within publish/subscribe messaging protocols. For example, an entity in the System (e.g. communication core network entity or a content broadcasting core network entity) can support message broker functionality. This broker functionality can be used by the devices to exchange user-defined content-aware operation message with other entities in the system (e.g. Content Providers). This exchange can be facilitated by each entity subscribing to the message broker to receive messages from other entities. Likewise, each entity can publish message to the message broker that target other entities. The information elements of the user-defined content-aware operation message request and response protocol messages can be encapsulated and carried within the payloads of existing publish/subscribe protocols such MQTT or AMQP.

In yet another embodiment, user-defined content-aware operation information elements may be embedded within content streaming protocols. For example, streaming protocols such as but not limited to Real Time Messaging Protocol (RTMP), Real Time Streaming Protocol (RTSP), MPEG-DASH, Apple HTTP Live Streaming (HLS), WebRTC and SRT. In one type of embodiment, user-defined content-aware operation information elements may be embedded within one or more separate virtual channels or streams supported by the streaming protocol (e.g. RTMP). These virtual channels or streams are multiplexed together and sent over a single physical transport connection (e.g. TCP). For example, user-defined content-aware operation information elements can be sent on one channel/stream while multimedia content can be sent on another channel/stream. These two channels/streams can be multiplexed and sent together over a single transport connection between entities in the system.

Various types of user-defined content-aware operation message request and response protocol messages can be supported by the different entities. These may include but are not limited to the types of message defined in Table 6.

TABLE 6

User-defined content-aware operation protocol message types

| Type of content casting message | Description |
|---|---|
| Content-Aware Operation Default Settings Configuration Request | Issued by a content-aware operation client such as a user or application. This request is used to configure a device with the default content-aware operation settings of a user. In addition, this request may be forwarded by a device to configure a communication core network entity, a content broadcasting core network entity, and/or a content provider with the default content-aware operation settings of a user. The information elements contained in this request can include but are not limited to the types of information elements defined in Table 2. |
| Content-Aware Operation Default Settings Configuration Response | The response that is returned to the issuer of a Content-Aware Operation Default Settings Configuration Request. The information elements contained in this response can include but are not limited to a status code indicating whether the request was successfully performed as well as the information elements defined in Table 2. |
| Content-Aware Operation Request | Issued by a content-aware operation client such as a user or application. This request is used to configure the device with a content-aware operation that the user wishes the device to perform on their behalf. In addition, this request may be forwarded by a device to configure a communication core network entity, a content broadcasting core network entity, and/or a content provider with a content-aware operation that device would like assistance in |

TABLE 6-continued

User-defined content-aware operation protocol message types

| Type of content casting message | Description |
| --- | --- |
| | processing. The information elements contained in this request can include but are not limited to the types of information elements defined in Table 2. |
| Content-Aware Operation Response | The response that is returned to the issuer of a Content-Aware Operation Request. The information elements contained in this response can include but are not limited to a status code indicating whether the request was successfully performed as well as the information elements defined in Table 2. |
| Content-Aware Operation Subscription Request | A subscription request issued by a device capable of playing broadcasted or streamed multimedia content (e.g. DTV, phone, tablet, PC, etc.) to a content provider. A device issues this request to have the content provider notify the device if/when the content provider detects content-aware trigger criteria specified in the subscription request. The information elements contained in this request can include but are not limited to the types of information elements defined in Table 2. |
| Content-Aware Operation Notification | A notification issued by a content provider to a device capable of playing broadcasted or streamed multimedia content (e.g. DTV, phone, tablet, PC, etc.). A content provider issues this notification if/when it detects content-aware trigger criteria specified in the subscription request have been met. The information elements contained in this request can include but are not limited to the types of information elements defined in Table 2. |
| Content-Aware Operation Centric Metadata | Content centric metadata that a content provider shares with a device capable of playing broadcasted or streamed multimedia content (e.g. DTV, phone, tablet, PC, etc.). A device uses this metadata to assist it with processing and performing content-aware operations on behalf of users.<br>A content provider may share this metadata with a device via sending dedicated messages to the device that contain this metadata. Alternatively, a content provider can piggy-back this metadata within other messages that the content provider sends to the device. For example, the content provider can piggy-back metadata into messages that streamed, broadcasted or unicasted to devices depending on the protocols that the content provider uses to communicate with the device.<br>streaming |

Figure 9:
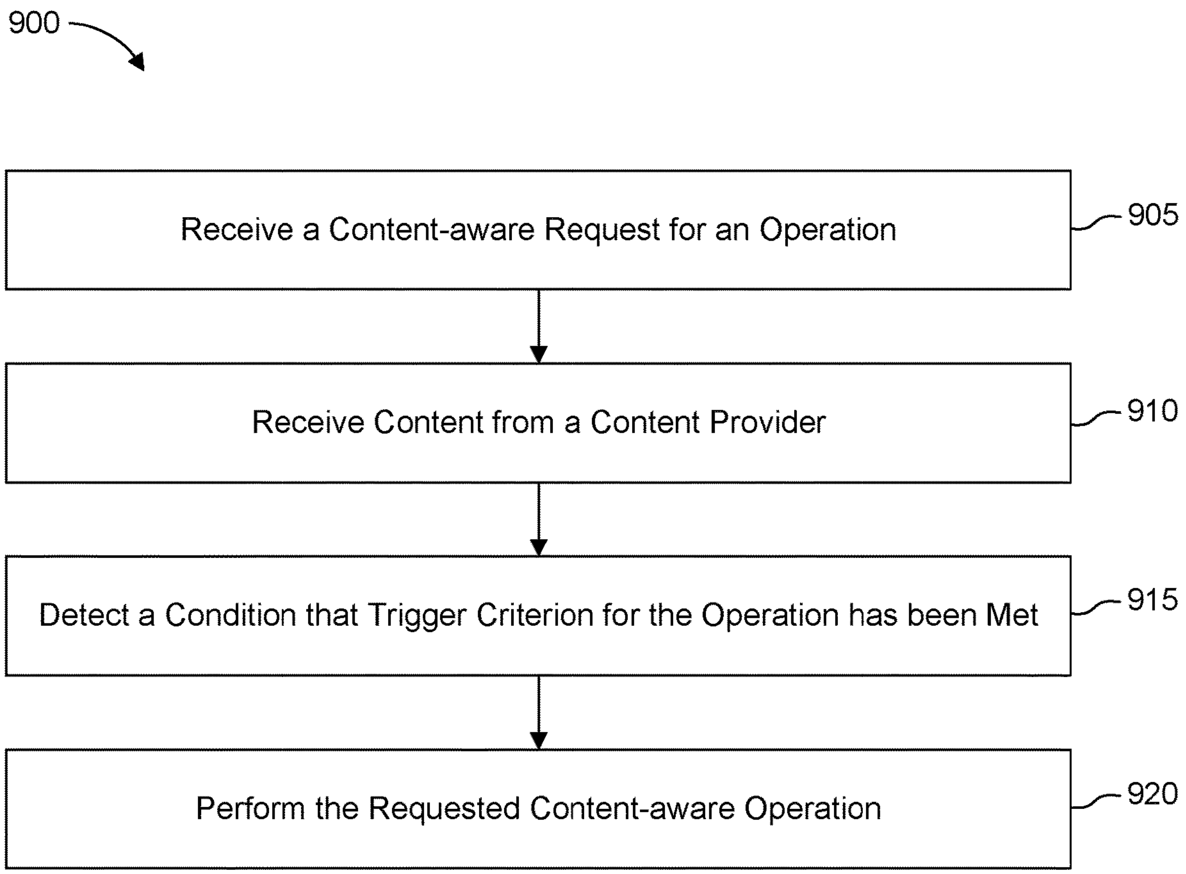
FIG. 9 depicts an example flow diagram of a method according to aspects of the disclosure.

FIG. 9 presents an example flow diagram 900 showing aspects of the disclosure. The method of flow diagram 900 may be performed by a viewing device operating in an environment described hereinabove. At 905, the viewing device receives a content aware request for an operation to be performed by the viewing device. The request includes trigger criteria to be met in order for the requested operation to be performed. At 910, the viewing device receives digital content, such as digital multimedia content, from a content provider. At 915, a detection of a condition occurs that trigger criteria for the operation to be performed has been met. In one embodiment, the condition is detected when a match between the trigger criteria and the received digital content occurs. At 920, the viewing device performs the requested operation as a result of the detection that the trigger criteria to perform the operation has been met.

In one embodiment, receiving a request for an operation to be performed by the viewing device includes receiving a command from a remote-control device to establish at least one trigger criterion related to content not displayed by the viewing device. In this instance, the viewing device may be displaying a first digital content, such as a first program being displayed, and the trigger criterion is related to a second digital content, such as a second program that is not displayed. In this instance the at least one trigger criterion may be related to the second program which is not being actively displayed. In one aspect, the content received from a content provider includes digital content and related metadata. In one aspect, detecting the condition that trigger criteria for the operation to be performed has been met may involve detecting one or more of receiving content and metadata related to a trigger criteria and matching the received metadata to the trigger criteria, and/or receiving a notification from a service provider (or the content provider) that content metadata matches and the trigger criteria. In another aspect of the disclosure, the viewing device may perform the requested operation by sending a text message, changing a display on the viewing device to display a program associated with the detected trigger criteria, changing a display on a secondary device to display a program associated with the detected trigger criteria, recording multimedia content associated with the detected trigger criteria, and/or displaying a notification on the screen of the viewing device or a secondary device.

In the example flow 900, the viewing device may receive a request for an operation including trigger criteria where the trigger criteria include a specified content-based event occurring within a multimedia content selection. The specified content-based event may include one or more of a start/end of a timeout in a sporting event, a changing of a score in a sporting event, a performance by a particular singer, a particular scene in a movie, and/or a start of final game-show round. Receiving a request for an operation including trigger criteria may also include receiving a request wherein the trigger criteria include the start or end of a commercial advertisement associated with a multimedia content selection.

Figure 10:
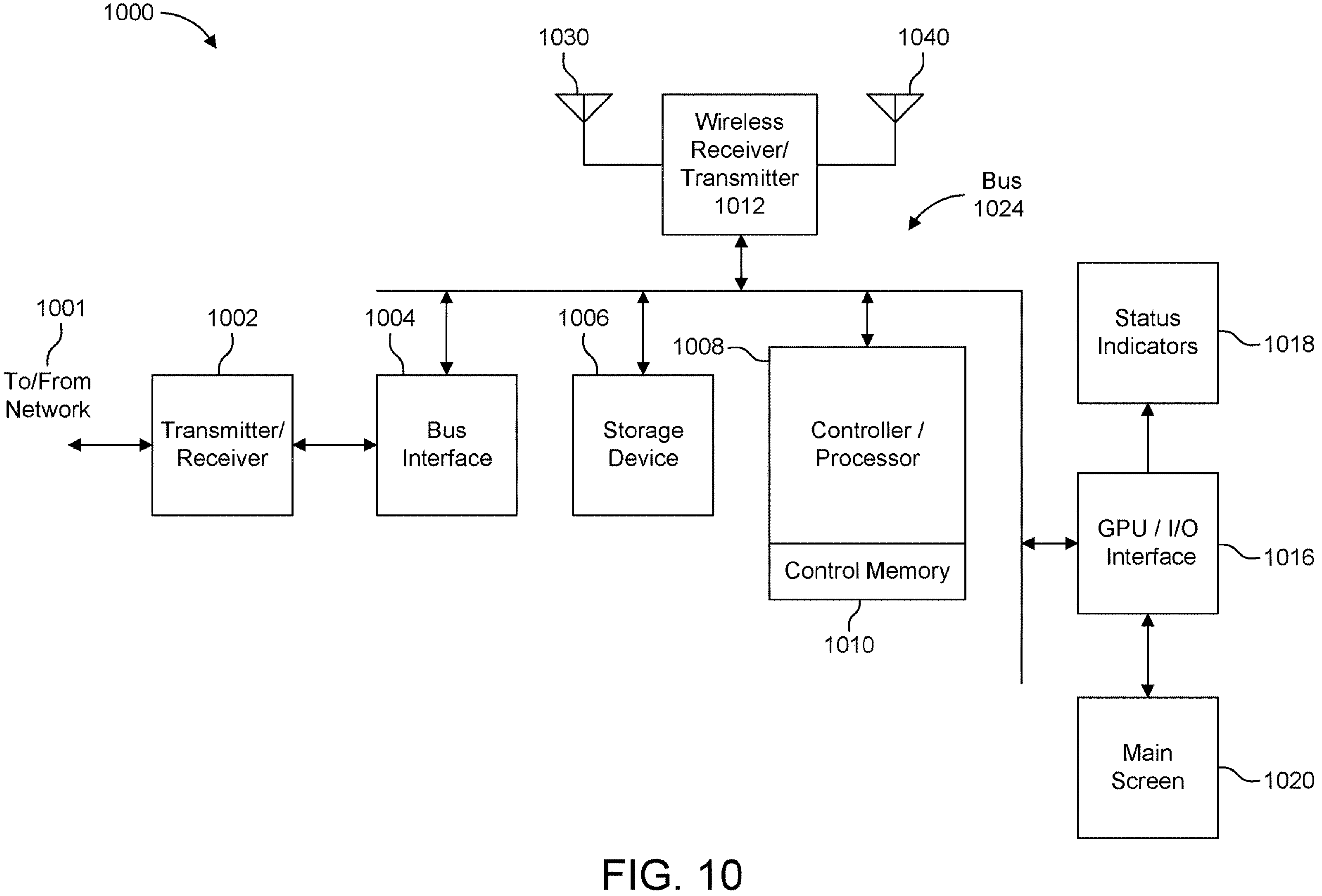
FIG. 10 depicts an example block diagram of a content-aware processing device.

FIG. 10 is a depiction of an example display device architecture 900, such as for a DTV, laptop computer, desktop computer, and the like configured to perform the method of FIG. 9. The apparatus of FIG. 10 can be either a special-purpose machine, or part of a larger machine that performs other tasks. For example, the apparatus of FIG. 10 can be an access point or an access point capable device that can support a wireless local area network and a display for a user to interact with content. Such a machine can be a digital television, a laptop, a personal computer, a mobile phone, a tablet, and the like that is configured to act as an interactive device. Here, for simplicity, the description may follow that of a DTV, but other devices, such as those listed above, are also possible as is well understood by those of skill in the art.

The apparatus 1000 of FIG. 10 includes a transmitter/receiver interface 1002 providing connectivity to IP network to receive digital content. The interface 1002 connects to the bus interface 1004 which allows access to the internal bus 1024. Other non-bus implementations are also possible as is well known to those of skill in the art. Present on bus 1024 are a storage device 1006 which can be used for any general storage such as retrieved or requested data and network management data, parameters, and digital content, and executable software instruction programs. Storage device 1006 may also serve as disk or solid-state storage for the information collected as displayable digital content. Main executable programs, utility and other programs may be under the control of controller/processor 1008.

This controller/processor 1008 may be a single processor or a multiplicity of processors performing the tasks of digital content data acquisition, user interface control, and resource management. Controller/processor 1008 can perform the method described in FIG. 9. Control memory 1010 may also supply program instruction and configuration control for controller/processor 1008. The status indicators 1018 are a user interface and allows a user, system owner, or system manager to see a status of the apparatus 1000. Such indicators may include a display, LEDs, speaker, and the like. A graphical processing unit (GPU) and input/output (I/O) interface 1016 allows the device to connect to a main display screen 1020 that may be used to display digital content on the device 1000. The I/O interface 1016 may also include a be a hardline interface, such as an Ethernet interface for a local area network or may be an HDMI interface for the main screen 1020. Other options for the I/O interface are a RF or IR interface for a remote control of the apparatus 1000. Another option of I/O interface 1016 is an interactive interface which may include the use of a separate display device (secondary device), keyboard, mouse, light pen, and the like.

Apparatus 1000 has a wireless network interface 1012 which allows access to and from wireless devices, such as receiving viewer devices. The wireless receiving viewer devices may be those that are known and registered to a WLAN of the apparatus 1000. Such an interface 1012 includes all elements to control a wireless network, including the use of wireless network protocols such as IEEE 802.XX, Bluetooth, other near field protocols, and the like for communication between the apparatus 1000 and receiving viewer devices.

As can be appreciated by one of skill in the art, combinations of features of various utilizations of the current disclosure can be combined unless otherwise specifically stated. Thus, features of the various figures may easily be combined. For example, a setup or configuration of a function described herein may be generated for a DTV such that a DTV content-aware operation is performed for a viewer using either or both of a personal device, a secondary device, or a hologram concurrently. In that instance the viewer may also invoke a DTV content-aware operation request for a second (or more) viewer to share the viewing DTV experience. Combining features described in this disclosure is within the scope of the concepts presented herein. Such combinations of concepts and features are considered viable embodiments unless otherwise restricted if indicated herein.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus, hardware and software apparatus. An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device.

Additionally, the methods may be implemented by instructions being performed by a processor, and such instructions may be stored on one or more processors or computer-readable media such as, for example, an integrated circuit, a software carrier or other storage device such as, for example, a hard disk, a compact diskette ("CD" or "DVD"), a random-access memory ("RAM"), a read-only memory ("ROM") or any other magnetic, optical, or solid-state media. The instructions may form an application program tangibly embodied on a computer-readable medium such as any of the media listed above or known to those of skill in the art. The instructions thus stored are useful to execute elements of hardware and software to perform the steps of the method described herein. In this disclosure, the computer-readable media is useful to instruct either and/or both the first processor and the second processor to perform the steps of the method disclosed herein.

What is claimed:

1. A method performing an action by a device, the method comprising:

receiving a request for the action to be performed by the device, wherein the request comprises an event criteria for triggering the requested action associated with one or more identified content when the event occurs within the one or more identified content;

processing the received request to extract the requested action and the event criteria for triggering the requested action;

receiving metadata, the metadata including information indicating content-based events within the one or more identified content; and triggering the requested action associated with the one or more identified content based on the received metadata indicating that the event criteria occurring within the one or more identified content occurred.

2. The method of claim 1, wherein receiving metadata related to the event within the content further comprises receiving the content along with the metadata from a content provider in response to sending the request to the content provider.

3. The method of claim 1, wherein receiving the request for the action to be performed by the device comprises receiving a command from a remote-control device to establish at least one event criterion related to content not displayed by the device.

4. The method of claim 1, wherein triggering comprises receiving a notification from a service provider that the metadata matches the event criteria, wherein the service provider is a content provider or is separate from the content provider.

5. The method of claim 1, wherein triggering the requested action comprises one or more of:

sending a text message;

changing a display on the device to display a program associated with the event;

changing a display on a secondary device to display a program associated with the event;

recording multimedia content associated with the event; and displaying a notification on a screen of the device or a secondary device.

6. The method of claim 1, wherein receiving the request for the action to be performed by the device comprises receiving a request wherein the event criteria includes a content-based event occurring within a multimedia content selection.

7. The method of claim 6, wherein the content-based event includes one or more of a start/end of a timeout in a sporting event, a changing of a score in a sporting event, a performance by a particular singer, a particular scene in a movie, or a start of final game-show round.

8. An apparatus to receive and display digital content, the apparatus comprising:

a processor; and a transceiver operably coupled to the processor, the processor and transceiver configured to:

receive a request for an action to be performed by the apparatus, wherein the request comprises an event criteria for triggering the requested action associated with one or more identified content when the event occurs with the one or more identified content;

process the received request to extract the requested action and the event criteria for triggering the requested action;

receive metadata, the metadata including information indicating content-based events within the one or more identified content; and triggering the requested action associated with the one or more identified content based on the received metadata indicating that the event criteria occurring with the one or more identified content occurred.

9. The apparatus of claim 8, wherein the receiver receives metadata related to the event within the content by receiving the content along with the metadata from a content provider in response to sending the request to the content provider.

10. The apparatus of claim 8, wherein the receiver receives a command from a remote-control device to establish at least one event criterion related to content not displayed by the apparatus.

11. The apparatus of claim 8, wherein the processor triggers based on a notification from a service provider that content metadata matches the event criteria, wherein the service provider is a content provider or is separate from the content provider.

12. The apparatus of claim 8, wherein the processor triggers the requested action comprising any one or more of:

transmit a text message;

change a display on the apparatus to display a program associated with the event;

a display on a secondary device to display a program associated with the event;

record multimedia content associated with the event; and display a notification on a screen of the apparatus or a secondary device.

13. The apparatus of claim 8, wherein the event criteria include a content-based event occurring within a multimedia content selection.

14. The apparatus of claim 13, wherein the content-based event includes one or more of a start/end of a timeout in a sporting event, a changing of a score in a sporting event, a performance by a particular singer, a particular scene in a movie, or a start of final game-show round.

15. The apparatus of claim 8, wherein the apparatus is one of a digital television, a smart phone, a tablet computer, a laptop computer, a desktop computer, a set-top box with a connected display or an augmented reality head-mounted device.

16. A non-transient computer-readable storage media having instructions which, when executed by a processor, perform the steps of:

receiving a request for an action to be performed by a device, wherein the request comprises an event criteria for triggering the requested action associated with one or more identified content when the event occurs within the one or more identified content;

processing the received request to extract the requested action and the event criteria for triggering the requested action;

receiving metadata, the metadata including information indicating content-based events within the one or more identified content; and triggering the requested action associated with the one or more identified content based on the received metadata indicating that the event criteria occurring within the one or more identified content occurred.

17. The non-transient computer-readable storage media of claim 16, wherein receiving metadata related to the event within the content further comprises receiving the content along with the metadata from a content provider in response to sending the request to the content provider.

18. The non-transient computer-readable storage media of claim 16, wherein receiving the request for the action to be performed by an apparatus comprises receiving a command from a remote-control device to establish at least one event criterion related to content not displayed by the device.

19. The non-transient computer-readable storage media of claim 16, wherein triggering comprises receiving a notification from a service provider that the metadata matches the event criteria, wherein the service provider is a content provider or is separate from the content provider.

20. The non-transient computer-readable storage media of claim 16, wherein triggering the requested action comprises one or more of:

sending a text message;

changing a display on the device to display a program associated with the event;

changing a display on a secondary device to display a program associated with the event;

recording multimedia content associated with the event; and displaying a notification on a screen of the device or a secondary device.

* * * * *